April 11, 1961 R. W. HEWES 2,979,295
ROLLER BEARING SUPPORTS FOR RAILWAY SWITCH POINTS
Filed May 6, 1957 2 Sheets-Sheet 1

INVENTOR.
R.W. HEWES
BY
*Forest B. Hitchcock*
HIS ATTORNEY

INVENTOR.
R. W. HEWES
BY Forest B. Hitchcock
HIS ATTORNEY

United States Patent Office 2,979,295
Patented Apr. 11, 1961

2,979,295

ROLLER BEARING SUPPORTS FOR RAILWAY SWITCH POINTS

Ralph W. Hewes, Rochester, N.Y., assignor to General Railway Signal Company, Rochester, N.Y.

Filed May 6, 1957, Ser. No. 657,372

5 Claims. (Cl. 246—435)

This invention relates to improvements in railway switch point operation and more particularly to a switch point supporting means wherein the switch point is resiliently supported on a roller bearing to reduce the friction load during movement of the switch points from one position to another, thus reducing the power requirements of the switch operating mechanism.

In present day railroad construction, heavier rails and longer switch turnouts are used extensively due to heavier rolling equipment and faster speeds. This results in heavier and longer switch point mass to be moved when the switch points are operated from one position to another. As these switch points normally rest on tie plates, considerable friction and drag is present when movement occurs and the common practice of lubricating the tie plate surfaces to reduce friction is not considered satisfactory.

Certain types of roller bearing supports for the switch points have been proposed but as a general rule manufacturing costs are quite excessive and maintenance is usually very difficult due to the proximity of the regular switch point operating rods and their adjusting means which require adjustments at regular intervals. Also, in structures where certain parts of the roller bearing supports are attached to the main rails, maintenance problems occur when rails are changed out or adjustments are required to correct the spacing between the switch points and the main rails.

The present invention contemplates a simplified resilient switch point roller bearing supporting structure which may be attached as a unit to each individual switch point, and can be maintained separately. Furthermore, the location and presence of the roller bearing support on the switch point will not interfere with other track and switch point maintainance.

In general, the contemplated structure consists of a spring steel torque rod which extends parallel to the switch point rail and is mounted thereto in a manner whereby a proportion of the switch point rail is normally resiliently supported above the surface of the tie plates. The presence of a train on the switch point rail will cause the rail to be depressed and twist the torque rod to the extent that the switch point rail will rest on the surface of the tie plates and support the train weight as it passes over the switch point. The torque created in the torque rod by the twisting action will quickly return the switch point rail to normal above the tie plates after it has been relieved of the train weight.

The manner of mounting the torque rod to the switch point rail is by means of two spaced brackets which are fastened to the switch point rail, a bracket supporting each end of the torque rod. One end of the torque rod is adjustably fastened in its associated bracket to prevent any turning of that end of the torque rod when locked in its fixed position. The other end of the torque rod is rotatably mounted in its associated bracket and has a pair of spaced lever arms fixed thereto in a manner whereby the lever arms rotate with the torque rod. A roller is journaled between the free ends of the two lever arms, the roller bearing on a tie plate of the railroad track bed. The torque rod and its associated brackets are attached to the switch point rail at a location some distance back from its free end, approximately a distance of about one third of the total length of the switch point.

Normally, with no train present on the switch point rail, the torque rod is adjusted to a proper position and fastened at its fixed end so that the roller bears against the surface of the tie plate and the switch point rail is supported a slight distance above the tie plates. The downward force exerted by the weight of the rail will be absorbed by the twisting of the torque rod and with proper adjustment a good proportion of the switch point rail will be resiliently supported above the tie plates. With the roller partially supporting the full weight of the switch point rail, it may be moved from one position to another with very little drag.

An object of the present invention is the provision of a switch point roller bearing support which may be fastened directly to each individual switch point rail in a position in close proximity and parallel thereto, whereby maintainance of the roller bearing support, other switch point apparatus or the roadbed may be carried on without interference with each other.

Another object of the present invention is the provision of a switch point roller bearing support which is simple in manufacture, operation and adjustment, and one in which resiliency is supplied by making use of the torque rod principle, which torque rod may be supplied from standard stock of the correct length to meet the particular installation requirements for resiliency and spacing of its supporting brackets.

Other objects, purposes and characteristic features of the present invention will be apparent from the following description when considered in connection with the accompanying drawings in which.

Figure 1:
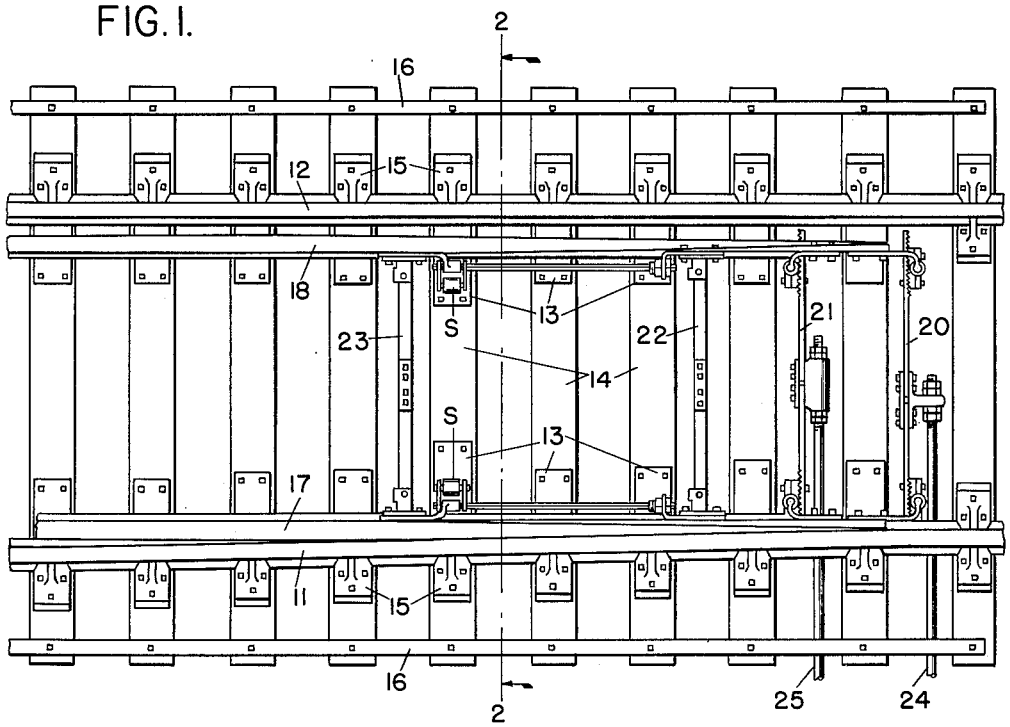
Fig. 1 is a plan view of a typical switch layout showing a roller bearing support of the present invention attached to each switch point.
Figure 2:
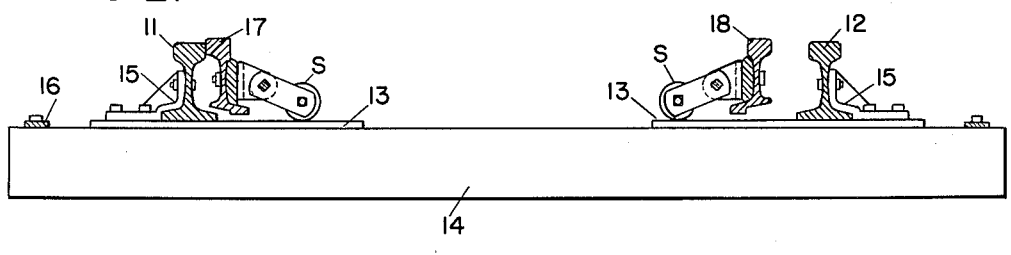
Fig. 2 is an enlarged sectional view taken substantially on the line 2—2 of Fig. 1 as viewed in the direction of the arrows, with parts omitted to more clearly show the roller bearing supports resting on the tie plates with the switch point rails supported above the tie plates.
Figure 7:
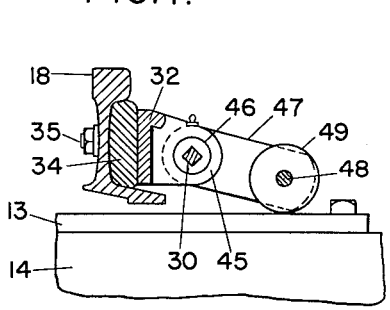
Fig. 7 is a sectional view taken on the line 7—7 of Fig. 3 as viewed in the direction of the arrows and shows an end view of the mounting of the rotatable end of the torque rod, the lever arms and the roller.
Figure 8:
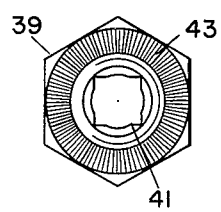
Figs. 8 and 9 are enlarged views of the adjusting socket portion of the torque rod anchoring means.
Figure 9:
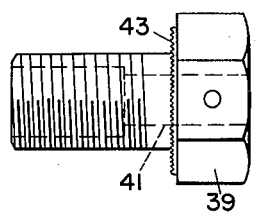
Figure 3:
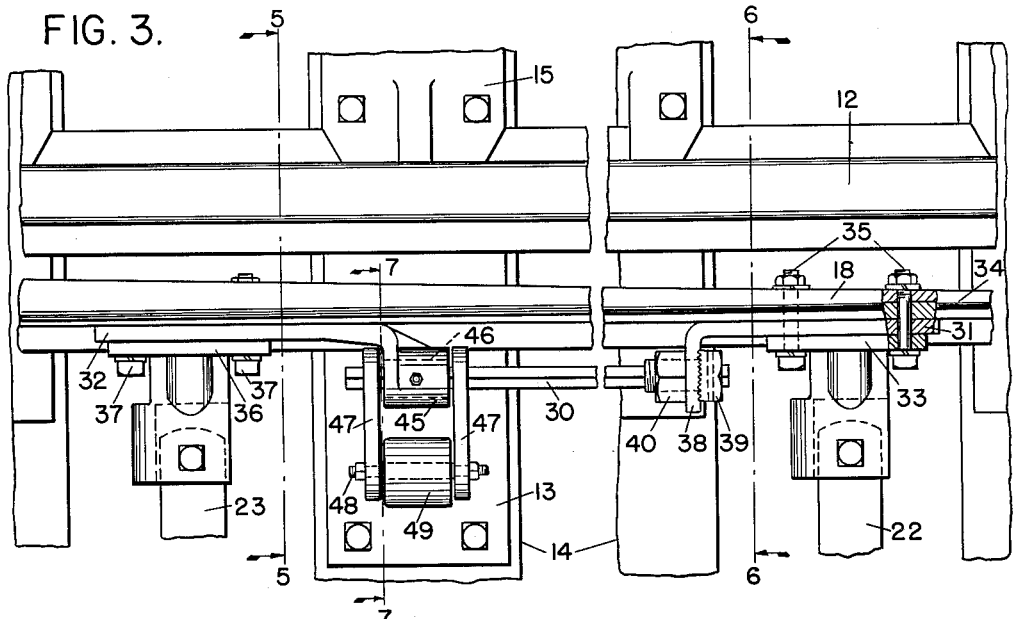
Fig. 3 is an enlarged plan view of a portion of the switch layout shown in Fig. 1 and shows the roller bearing support of the present invention in enlarged scale and the means for attaching it to the switch point rail.
Figure 4:
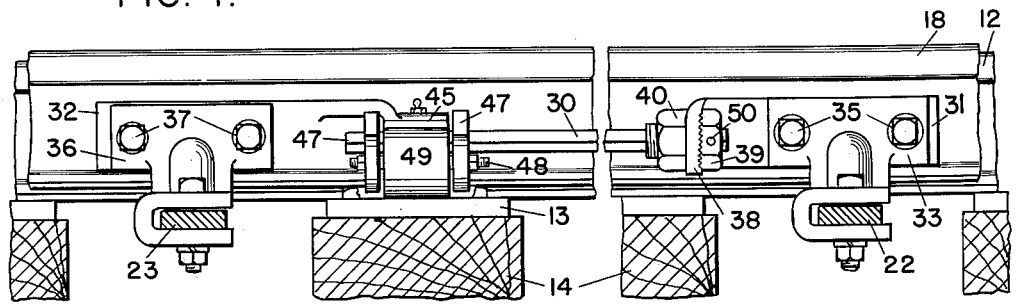
Fig. 4 is a side view of the apparatus shown in Fig. 3 with parts of the track switch shown in section.
Figures 5, 6:
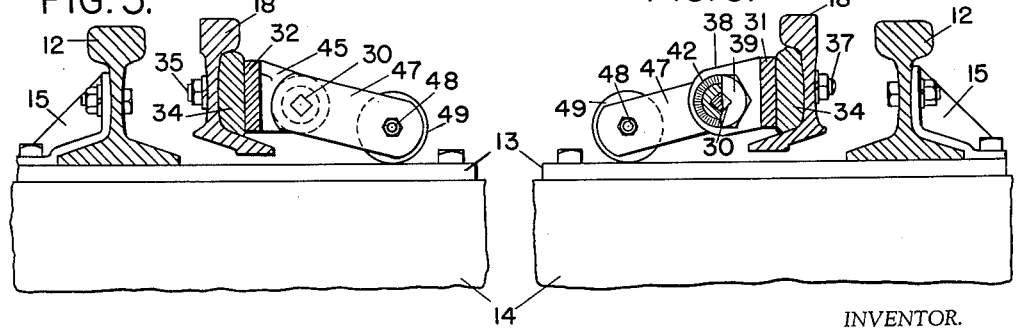
Fig. 5 is a sectional view taken on the line 5—5 of Fig. 3 as viewed in the direction of the arrows and shows an end view of the roller bearing end of the roller bearing support of the present invention.
Fig. 6 is a sectional view taken on the line 6—6 of Fig. 3 as viewed in the direction of the arrows and shows an end view of the torque rod adjustable anchoring means of the roller bearing support of the present invention.

In the drawings the different parts will be referred to by distinctive reference characters and all like parts the same reference characters. Referring now more particularly to Figs. 1 and 2 there has been shown a typical switch layout having a pair of main rails 11 and 12 suitably mounted on the tie plates 13 and roadbed ties 14 and braced against spreading by the usual rail braces 15. The ties 14 are spaced and held in position by the usual spacing bars 16. Within the limits of the main rails 11 and 12 are located the switch point rails 17 and 18 which also are positioned over the tie plates 13. The heel ends (not shown) of these movable switch point rails 17 and 18 are connected to the stationary switch rails in the usual way and the leading ends are free to move between the main rails 11 and 12. As shown on the drawings, the switch point rail 17 is against the main rail 11 and there is a clearance between the switch point rail 18 and the main rail 12 to permit passage of a wheel flange. In this position traffic is set up for a straight main line movement.

The switch point rails 17 and 18 are spaced apart and held in position by a series of so called switch rods comprising a front rod 20, a switch operating rod 21 and tie rods 22 and 23, or more if needed. The front rod 20 and the operating rod 21 are preferably adjustable and are connected across the leading ends of the switch points to properly space them and hold them in a firm upright rigid position. These two rods are also connected to a switch throwing mechanism (not shown) by means of connecting rods 24 and 25 to provide a means for operating the track switch and giving switch position indications. The tie rods, such as 22 and 23 are spaced about five or six feet apart throughout the length of the switch point rails 17 and 18 and serve the purpose of holding the swtich point rails upright and rigid and keeping them properly spaced.

A roller bearing support S constructed in accordance with the present invention is shown attached to each of the switch point rails 17 and 18. In the particular application shown on the drawings, the roller bearing support assemblies S have been fastened to the switch point rails 17 and 18 by the same bolts which fasten the tie rods 22 and 23 to the rails, the torque rod unit of the roller bearing support assembly extending the full distance between the tie rods. However, it should be understood that a shorter roller bearing support assembly could be used and it could be individually fastened to the switch point rail. Also, in installations where the switch point rails are unusually long and heavy, two roller bearing supports could be attached to each rail at different locations to adequately support the rail.

Referring now more particularly to the structure of the roller bearing support as shown in Figs. 3 to 9, inclusive, the torque rod 30 extends between two spaced angle brackets 31 and 32. The flat straight portion of the bracket 31 is inserted between the web of the switch point rail 18 and the switch lug portion 33 of the tie rod 22 with a suitable shim plate 34 placed next to the rail web. Bolts 35 passing through the switch lug 33, bracket 31, shim plate 34 and the web of the rail 18 securely fasten the bracket 31 to the rail 18. The bracket 32 is similarly mounted between the rail 18 and the switch lug 36 of the tie rod 23 by means of bolts 37.

The angle portion 38 of the bracket 31 is provided with a round hole therethrough to receive a threaded socket member 39 which is held in place by a lock nut 40. This socket member 39 (see Figs. 8 and 9) is in the nature of a bolt having a squared hole 41 therethrough to receive one end of the torque rod 30 which is of square cross section. Radial saw tooth serrations 42 are provided on the face of the bracket portion 38 and similar serrations 43 are provided on the underside of the head portion of the socket member 39. When assembled, these saw tooth serrations coact with each other to prevent the socket member 39 from turning in the bracket 31. As the end of the squared torque rod 30 lies within the aquared hole 41 in the socket member 39, this end of the torque rod is held secure and likewise prevented from turning.

The bracket 32 is formed with an angle portion 45 shaped in the form of a boss which is provided with a round hole therethrough to receive a bushing 46, which is free to rotate therein. This bushing 46 is also provided with a squared hole therethrough to receive the other end of the squared torque rod 30. Thus, this other end ofthe torque rod 30 is rotatably mounted in the bracket 32.

Located one one each side of the boss portion 45 of the bracket 32 are a pair of lever arms 47. These lever arms 47 are also provided with squared holes therethrough to receive this other end of squared torque rod 30, so that the lever arms 47 will rotate with the torque rod 30. The free ends of the lever arms 47 are spaced and tied together by means of a shouldered bolt 48 on which is mounted a roller 49. As the torque rod 30 is slidably mounted in the squared holes in the socket member 39 and the bushing 46, a cross pin 50 is inserted in a hole in the head of the socket member 39, the pin 50 passing through a hole in the torque rod 30 to prevent longitudinal movement of the torque rod.

After the complete roller bearing support S has been assembled to the switch point rail 18 as described above, proper adjustment may be made to position the switch point rail the desired distance above the tie plates 13. With the lock nut 40 loose and the serrations 42 and 43 disengaged, the socket member 39 and its associated torque rod 30 and lever arms 47 are free to rotate, and gravity bias will cause the roller 49 to rest on the tie plate 13. By turning the socket member 39 in a counter-clockwise direction away from the switch point rail 18, the torque rod 30 would tend to rotate likewise. As the roller 49 is bearing against the surface of the tie plate 13, the lever arms 47 can not rotate and the turning force of the socket member 39 will twist the torque rod and create a torque which is opposed by the weight of the switch point rail 18. When this torque is sufficient to overcome the weight of the rail 18, a good portion of the rail will be lifted free of the tie plates 13, the roller 49 acting as a fulcrum and supporting the weight of the rail. When the desired rail clearance has been achieved, the lock nut 40 is pulled up tight against the bracket portion 38 and the serrations 42 and 43 coacting with each other will securely lock the socket member 39 to the angle portion 38 of the bracket 33. As the socket member 39 is locked against turning, that particular coacting end of the torque rod 30 is also held against turning.

With the socket member 39 securely locked in its adjusted position, the switch point rail 18 is now resiliently held in its suspended position above the tie plates 13 by the torque exerted by the torque rod 30. The other roller bearing support S fastened to the other switch point rail 17 is similarly adjusted to partially support its rail weight. With the switch point rails 17 and 18 in their suspended positions and the rollers 49 carrying most of their weight, the switch points may be moved from one operated position to the other with very little resistance, the rollers moving freely over the surface of the tie plates 13.

As mentioned previously, the amount of torque normally built up in the torque rod 30 is merely sufficient to carry the desired amount of rail weight. Assuming that a train now enters the switch, its wheels would run on the switch point rail 17 and the main rail 12 with the switch in the position shown in Fig. 1. As the switch point rail 18 is an open position, it would not carry any of the train weight. However, the weight of the train would force the switch point rail 17 downward so that the rail would rest on the tie plates 13 and provide a solid support for the rail during the train movement thereover. This downward movement of the rail 17 would cause a further twisting movement in the torque rod 30, thus building up more torque therein. As the train passes over the switch and the switch point 17 is relieved of the train weight, the torque then present in the torque rod 30 will cause the torque rod to untwist and again raise the rail 17 to its normal position a slight distance above the tie plates 13.

It is believed that the present invention provides a simple and efficient resilient roller bearing supporting means for railway switch point rails and one in which the application to the switch point rail is versatile in use and easily maintained.

Having shown and described one particular form which the invention could assume, it should be understood that various adaptations and deviations in the structure could be made without departing from the spirit of the invention or the scope of the appending claims.

What I claim is:

1. In a roller bearing support for a railway track switch point rail, a torque rod positioned parallel to and adjacent said switch point rail and having one end fixedly mounted thereto and the other end rotatably mounted thereto in a bearing support fixed to said switch rail for receiving the rotatable end of the said torque rod, a lever arm fixed to the rotatable end of said torque rod and a roller mounted on the free end of said lever arm, said lever arm positioned to have said roller bear on a tie plate, whereby said torque rod resiliently supports said switch point rail above the surface of said tie plate.

2. In a supporting structure for a railway track switch point rail, a pair of spaced angle brackets each attached to said switch point rail, a torque rod extending between said angle brackets and having one end fixed to one of said brackets and its other end rotatably mounted in a bearing support fixed to the other of said brackets, and a lever arm fixed at one end to the rotatable end of said torque rod and having a roller mounted on its other end, said roller resting on a flat plate portion of the railway roadbed and said torque rod resiliently supporting said switch point rail above said railway roadbed.

3. In a roller bearing support for resiliently supporting a railway track switch point rail, a pair of spaced angle brackets each attached to said switch point rail, a bushing rotatably mounted in one of said brackets and a socket member mounted in the other of said brackets, means for adjustably locating and holding said socket member in the other of said brackets, a torque rod extending between said angle brackets and having one end fixed in said bushing and its other end fixed in said socket member, a pair of lever arms fixed at one end to said torque rod and located one on each side of said bushing, a roller pivotally mounted between the other ends of said lever arms, said socket member adjustable locating and holding means determining the rotated position of said torque rod and said lever arms and said roller with respect to the track rail roadbed tie plates, whereby said roller bears on said tie plate and said switch point rail is resiliently supported above said tie plates as determined by the resistance of the twisting of the torque rod as opposed to the weight of the rail.

4. In a railway track switch, two spaced main rails and two spaced movable switch point rails mounted on ties and tie plates, each of said movable switch point rails having a roller bearing support mounted thereon, said roller bearing support having a torque rod of which one end is fixedly mounted to said switch point rail and its other end is rotatably mounted to said switch point rail, a lever arm fixed to the rotatable end of said torque rod and having a roller mounted on its free end, said lever arm positioned to have said roller bear on one of said tie plates causing said torque rod to normally resiliently support said switch point rail above said tie plates, said torque rod absorbing the energy created when a train forces said switch point rail downward to rest on said tie plates, said energy stored in said torque rod returning said switch point rail to a normal position above said tie plates upon removal of said train.

5. In a railway track switch, two spaced main rails and two spaced movable switch point rails mounted on ties and tie plates, each of said movable switch point rails having a roller bearing support mounted thereon, said roller bearing support comprising a pair of spaced angle brackets each attached to said switch point rail, a bushing rotatably mounted in one of said brackets and a socket member mounted in the other of said brackets, means for adjustably locating and holding said socket member in the other of said brackets, a torque rod extending between said angle brackets and having one end fixed in said bushing and its other end fixed in said socket member, a pair of lever arms fixed at one end to said torque rod and located one on each side of said bushing, a roller pivotally mounted between the other ends of said lever arms, said socket member adjustable locating and holding means positioning said lever arms so that said roller bears on one of said tie plates, said torque rod absorbing the force exerted by the weight of said switch point rail and still maintaining said resiliently supported above the surface of said tie plates, whereby said switch point rails will roll on said roller bearing supports during movement from one operated position to another and whereby one of said switch point rails will be depressed to rest on said tie plates during the presence of a train and the torque thus created in said torque rod will return said switch point rail to a normal suspended position after the passage of said train.

References Cited in the file of this patent

UNITED STATES PATENTS

| | | |
|---|---|---|
| 957,719 | Seeley | May 10, 1910 |
| 1,599,733 | Williams | Sept. 14, 1926 |
| 1,965,803 | Post et al. | July 10, 1934 |
| 2,567,287 | Ingram | Sept. 11, 1951 |
| 2,685,621 | Callender | Aug. 3, 1954 |
| 2,713,484 | Pierce | July 19, 1955 |
| 2,797,434 | Vigmostad | July 2, 1957 |
| 2,823,413 | Stewart | Feb. 18, 1958 |